United States Patent

[11] 3,624,068

| [72] | Inventors | Johannes Dehnert;<br>Gerhard Gnad, both of Ludwigshafen,<br>Germany |
|---|---|---|
| [21] | Appl. No. | 779,652 |
| [22] | Filed | Nov. 27, 1968 |
| [45] | Patented | Nov. 30, 1971 |
| [73] | Assignee | Badische Anilin & Soda-Fabrik<br>Aktiengesellschaft<br>Ludwigshafen/Rhine, Germany |
| [32] | Priority | Dec. 1, 1967 |
| [33] | | Germany |
| [31] | | P 16 44 074.7 |

[54] DI(CARBOXYLIC ACID ESTER)-PHENYL-AZO-NAPHTHOL DYES
4 Claims, No Drawings

[52] U.S. Cl............................................................ 260/199,
8/41 B, 260/471

[51] Int. Cl................................................C07c 107/08,
C09b 29/30
[50] Field of Search........................................... 260/199

[56] References Cited
UNITED STATES PATENTS
3,413,280  10/1968  Montmollin et al. .......... 260/199 X
FOREIGN PATENTS
402,229  3/1966  Switzerland.................. 260/193

*Primary Examiner*—Charles B. Parker
*Assistant Examiner*—Warren C. F.
*Attorney*—Marzall, Johnston, Cook & Root ABSTRACT: Acid dyes derived from aminobenzene dicarboxylic acid esters and 1-hydroxy-7-amino-naphthalene-3-sulfonic acid, particularly for dyeing wool or textile material of synthetic linear polyamides.

DI(CARBOXYLIC ACID ESTER)-PHENYL-AZO-NAPHTHOL DYES

This invention relates to new monoazo dyes having the general formula (I):

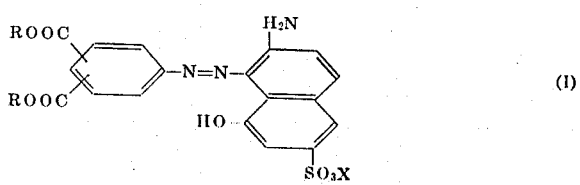

where the radicals R may be identical or different and each denotes an unsubstituted or substituted alkyl, aralkyl or cycloalkyl radical and X denotes hydrogen, sodium or potassium.

Examples of the radicals R are methyl, ethyl, n-propyl, isopropyl, n-butyl, isobutyl, tert-butyl, benzyl, phenylethyl and cyclohexyl.

The radicals R may bear as substituents for example hydroxy, alkoxy or aroxy groups or halogen. Examples of specific substituents are chlorine, methoxy, ethoxy, 2-methoxyethoxy, butoxy and phenoxy.

Examples of substituted radicals R are chloroethyl, methoxyethyl, ethoxyethyl, butoxyethyl, phenoxyethyl, methoxyethoxyethyl and ethoxy-ethoxyethyl.

Dyes which have special industrial importance have the general formula (Ia):

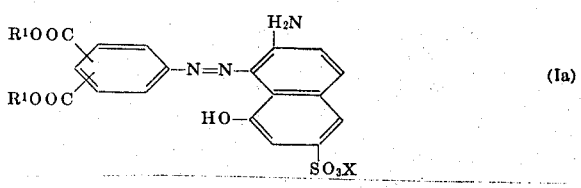

where each $R^1$ denotes an alkyl radical having one to four carbon atoms, a methoxyethyl, ethoxyethyl, butoxyethyl, methoxyethoxyethyl ($-CH_2CH_2OCH_2CH_2-OCH_3$) or ethoxyethoxyethyl ($-CH_2CH_2-OCH_2CH_2-OCH_2CH_3$) group and X denotes hydrogen, sodium or potassium.

The new dyes are eminently suitable for dyeing fibers and textile material of synthetic polyamides such as nylon 6 or nylon 6,6 and wool. Dyeings obtained therewith have excellent fastnesses, particularly light fastness, wet fastness and thermal resistance.

The new dyes can be obtained by the reaction of diazo compounds of amines having the general formula (II):

with 1-hydroxy-7-aminonaphthalene-3-sulfonic acid.

The esters of aminoterephthalic acid, 2-aminoisophthalic acid, 4-aminoisophthalic acid, 5-aminoisophthalic acid, 3-aminophthalic acid or 4-aminophthalic acid are compounds having the formula (II). Compounds in which at least one carbalkoxy group is present in the meta-position to the amino group are preferred.

The following may be given as examples:
dimethyl 5-aminoisophthalate, diethyl 5-aminoisophthalate, di-(β-methoxyethyl) 5-aminoisophthalate, dimethyl aminoterephthalate, di-ethyl aminoterephthalate, dimethyl 4-aminophthalate, di-n-propyl aminoterephthalate, diethyl 4-aminophthalate, di-n-propyl 4-aminophthalate, dimethyl 3-aminophthalate, diethyl 3-aminophthalate, di-n-propyl 3-aminophthalate, diisobutyl 3-aminophthalate, diisobutyl 4-aminophthalate, di-n-propyl 5-aminoisophthalate, dicyclohexyl 5-aminoisophthalate, diisobutyl aminoterephthalate, di-(β-ethoxyethyl) aminoterephthalate, di-(β-phenoxyethyl) aminoterephthalate, dibenzyl aminoterephthalate, dicyclohexyl aminoterephthalate, dibenzyl aminoterephthalate, dicyclohexyl aminoterephthalate and diisopropyl 5-aminoisophthlate.

The compounds having the formula (II) may be diazotised in the usual way, for example in the presence of dilute hydrochloric or sulfuric acid in water with or without dispersing agents, in organic solvents such as glacial acetic acid or in mixtures of water and organic solvents.

A pH value as far as possible in the acid range is chosen for coupling.

The invention is illustrated by the following examples. Parts and percentages in the examples are by weight unless otherwise specified.

EXAMPLE 1

200 parts of ice is added to a solution of 20.9 parts of dimethyl 5-aminoisophthalate in 300 parts of water and 25 parts by volume of concentrated hydrochloric acid and then 30 parts of 23 percent sodium nitrite solution is allowed to flow in slowly at 0° to 5° C. The whole is stirred for another two hours at the same temperature and any excess of nitrous acid is removed as usual. A solution of the sodium salt of 24.3 parts of 7-amino-1-hydroxynaphthalene-3-sulfonic acid in 300 parts by volume of water is slowly added to the diazo solution. A pH value of 4 is then set up by adding concentrated aqueous sodium acetate solution. After coupling is over, the precipitated dyes having the formula

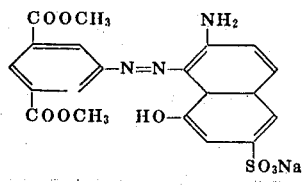

is suction filtered, washed with 10 percent sodium chloride solution and dried. A red powder is obtained which dissolves in water with a red color and dyes polyamide cloth red shades having very good fastness properties.

With the same coupling component and the diazo components given in the following table 1, dyes which give very fast dyeings on polyamides are obtained analogously.

TABLE 1

| Example | Diazo component | Shade of dyeing on polyamide |
|---|---|---|
| 2 | diethyl 5-aminoisophthalate | red |
| 3 | di-(β-methoxyethyl) 5-aminoisophthalate | red |
| 4 | dimethyl aminoterephthalate | bluish red |
| 5 | diethyl aminoterephthalate | bluish red |
| 6 | dimethyl 4-aminophthalate | bluish red |

EXAMPLE 7

26.6 parts of di-n-propyl aminoterephthalate is stirred intensely with 300 parts of water and 0.5 part of the reaction product of oleylamine with about 12 moles of ethylene oxide at room temperature for several hours. Twenty-five parts by volume of concentrated hydrochloric acid and 200 parts of ice are added and then 30 parts by volume of 23 percent sodium nitrite solution is allowed to flow in slowly at 0° to 5° C. The whole is stirred at the same temperature for another 2 hours and coupled with 24.3 parts of 7-amino-1-hydroxynaphthalene-3-sulfonic acid as described in example 1. A dark red powder of a dye having the formula

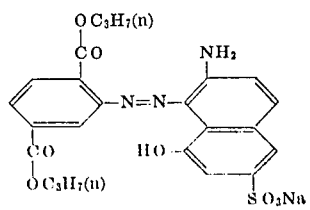

is obtained which dissolves in water with a red color and gives bluish red dyeings having excellent light and wet fastness properties on polyamide.

With the same coupling components and the diazo components given in the following table 2, other dyes are obtained in an equivalent way.

TABLE 2

| Example | Diazo component | Shade of dyeing on polyamide |
| --- | --- | --- |
| 8 | diethyl 4-aminophthalate | bluish red |
| 9 | di-n-propyl 4-aminophthalate | bluish red |

EXAMPLE 10

Thirty parts by volume of a 23 percent aqueous solution of sodium nitrite is allowed to flow slowly while stirring at 0° to 5° C. into a solution of 20.9 parts of dimethyl 3-aminophthalate in 300 parts by volume of glacial acetic acid and 24 parts by volume of concentrated hydrochloric acid. A little ice is added during the addition of the sodium nitrite solution. THe whole is stirred at the same temperature for another 2 hours and any excess of nitrous acid present is removed. A solution of the sodium salt of 24.3 parts of 7-amino-1-hydroxynaphthalene-3-sulfonic acid is added to the diazo solution and the further procedure of example 1 is followed. A dark red powder is obtained which dissolves in water to give a red coloration and produces red shades having excellent fastness properties on polyamide cloth.

Other dyes shown in the following table 3 are obtained with the same coupling component and the diazo components shown in the table by analogous procedures:

TABLE 3

| Example | Diazo component | Shade of dyeing on polyamide |
| --- | --- | --- |
| 11 | diethyl 3-aminophthalate | red |
| 12 | di-n-propyl 3-aminophthalate | red |
| 13 | diisobutyl 3-aminophthalate | red |
| 14 | diisobutyl 4-aminophthalate | bluish red |
| 15 | di-n-propyl 5-aminoisophthalate | red |
| 16 | dicyclohexyl 5-aminoisophthalate | red |
| 17 | diisobutyl aminoterephthalate | bluish red |
| 18 | di-(β-ethoxyethyl) aminoteriphthalate | bluish red |
| 19 | di-(β-phenoxyethyl) aminoterephthalate | bluish red |
| 20 | dibenzyl aminoterephthalate | bluish red |
| 21 | dicyclohexyl aminoterephthalate | bluish red |

We claim:
1. A monoazo dye having the formula

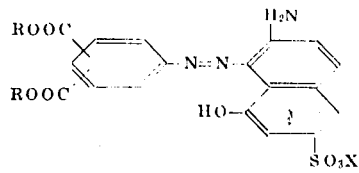

wherein R denotes alkyl of one to four carbon atoms, benzyl, phenylethyl, cyclohexyl, chloroethyl, hydroxyalkyl of up to four carbon atoms, alkoxy-alkyl of up to eight carbon atoms, methoxyethoxyethyl, ethoxyethoxyethyl or phenoxyethyl and X denotes hydrogen, sodium or potassium.

2. A monoazo dye having the formula

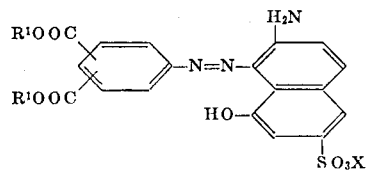

wherein $R^1$ denotes alkyl of one to four carbon atoms, methoxyethyl, ethoxyethyl, butoxyethyl, methoxyethoxyethyl or ethoxyethoxyethyl and X denotes hydrogen, sodium or potassium.

3. The dye having the formula:

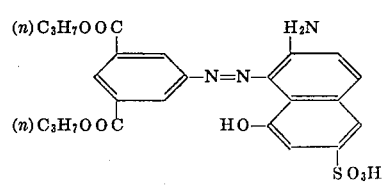

4. The dye having the formula:

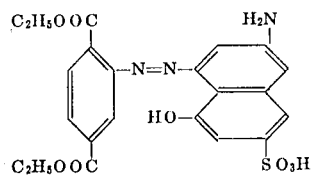

* * * * *

PO-1050
(5/69)

UNITED STATES PATENT OFFICE
CERTIFICATE OF CORRECTION

Patent No. 3,624,068          Dated November 30, 1971

Inventor(s) Johannes Dehnert and Gerhard Gnad

It is certified that error appears in the above-identified patent and that said Letters Patent are hereby corrected as shown below:

Column 2, lines 4 and 5, delete "dibenzyl aminoterephthalate, dicyclohexyl aminoterephthalate".

Column 4, line 4, "aminoteriphthalate" should read -- aminoterephthalate --; claim 4, that portion of the formula reading " H₂N" should read -- H₂N --.

Signed and sealed this 9th day of May 1972.

(SEAL)
Attest:

EDWARD M. FLETCHER, JR.           ROBERT GOTTSCHALK
Attesting Officer                 Commissioner of Patents